(12) United States Patent
Kurani et al.

(10) Patent No.: US 11,108,539 B2
(45) Date of Patent: Aug. 31, 2021

(54) TECHNIQUES FOR ANALYZING AND VERIFYING TIME IN MACHINE-BASED NETWORKS

(71) Applicant: Disney Enterprises, Inc., Burbank, CA (US)

(72) Inventors: Ketan N. Kurani, Monroe Township, NJ (US); Rab Mukraj, New York, NY (US); Michael J. Strein, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 261 days.

(21) Appl. No.: 15/820,395

(22) Filed: Nov. 21, 2017

(65) Prior Publication Data
US 2019/0158268 A1 May 23, 2019

(51) Int. Cl.
| G06F 15/16 | (2006.01) |
| H04L 7/04 | (2006.01) |
| H04N 21/242 | (2011.01) |
| H04L 29/06 | (2006.01) |
| H04L 12/26 | (2006.01) |
| H04H 20/12 | (2008.01) |
| H04J 3/06 | (2006.01) |
| H04J 3/14 | (2006.01) |
| H04N 5/073 | (2006.01) |

(52) U.S. Cl.
CPC .............. *H04L 7/04* (2013.01); *H04H 20/12* (2013.01); *H04L 43/00* (2013.01); *H04L 69/28* (2013.01); *H04N 21/242* (2013.01); *H04J 3/0664* (2013.01); *H04J 3/14* (2013.01); *H04N 5/073* (2013.01)

(58) Field of Classification Search
CPC ........................................................ H04L 7/04
USPC ........................................................ 709/248
See application file for complete search history.

(56) References Cited

U.S. PATENT DOCUMENTS

| 7,212,551 | B1 * | 5/2007 | Beshai | H04J 3/0664 370/509 |
| 7,822,806 | B2 * | 10/2010 | Frank | G06F 8/34 709/203 |
| 8,046,749 | B1 * | 10/2011 | Owen | G06F 17/18 717/141 |
| 8,571,005 | B1 * | 10/2013 | Vleugels | H04W 56/002 370/350 |
| 9,565,646 | B1 * | 2/2017 | Pearson | H04W 56/0035 |
| 2004/0167990 | A1 * | 8/2004 | Peer | H04J 3/0661 709/248 |
| 2010/0161723 | A1 * | 6/2010 | Bryce | H04N 21/242 709/203 |

(Continued)

*Primary Examiner* — Anthony Mejia
(74) *Attorney, Agent, or Firm* — Artegis Law Group, LLP (57) ABSTRACT

A technique for synchronizing time in a machine-based system. The technique includes receiving time reference information for a first operational element included in the system; analyzing the time reference information against a known correct timing state for the first operational element; determining that the first operational element is not properly synchronized based on the time reference information and the known correct timing state; and in response to determining that the first operational element is not properly synchronized, causing a fault indicator associated with the first operational element to be displayed on a machine that monitors a plurality of operational elements included in the system.

20 Claims, 6 Drawing Sheets

(56) References Cited

U.S. PATENT DOCUMENTS

| | | | |
|---|---|---|---|
| 2011/0138080 A1* | 6/2011 | Steiner | H04J 3/0664 709/248 |
| 2014/0327982 A1* | 11/2014 | Zhang | G11B 20/1024 360/48 |
| 2016/0150129 A1* | 5/2016 | Kumar | H04N 17/04 348/373 |
| 2016/0249307 A1* | 8/2016 | Thangarasa | H04W 56/001 |

* cited by examiner

TECHNIQUES FOR ANALYZING AND VERIFYING TIME IN MACHINE-BASED NETWORKS

BACKGROUND OF THE INVENTION

Field of the Invention

The present disclosure relates generally to computer networks, and, more specifically, to techniques for analyzing and verifying time in machine-based networks.

Description of the Related Art

Computer applications in automation systems, or any other coordinated, computer-based systems, rely on accurate clock signals and timing to ensure proper functionality. For example, the video and audio equipment employed in a broadcast plant are required to operate in "lock step" with each other. That is, the operations of each software application, device, or other operational element involved in switching between various video and audio feeds are synchronized with one another with a timing precision of 33 milliseconds (ms), which is the duration of one video frame when video is operating at 30 frames per second. To realize such precise timing between multiple functioning elements, the operations of each element have to be based on the same time reference or based off different time references that are synchronous with each other. Otherwise, flash frames and other unwanted visual artifacts can occur when cutting between different video streams in a broadcast.

The time references typically used when attempting to synchronize operations across different machines include Internet Protocol (IP) time references, such as NTP (Network Time Protocol) or PTP (Precision Time Protocol), and/or other clock references, such as PCR (Program Clock Reference) or Time Code. A large, complex plant, factory, or production facility may have many of these time references, which typically derive their master reference from known time sources such as Global Positioning System (GPS) or local atomic clocks. To synchronize across these different references, an overarching master time reference is implemented, where each individual time reference is synchronized to that master reference. Thus, by synchronizing to a common master, the different individual time references are synchronous with one another. For robust operation of the facility, each of the many devices and software applications that utilize these local references may include a priority structure in case of failure of the primary time reference for the device or software application.

Despite the generally robust nature of such time reference systems, in a complex or geographically extended system or plant, the timing and synchronization of operations across different distributed elements can still be lost. For example, if a software application or device in a geographically distributed system loses the communication path with the server machine providing an NTP timing reference, then the operations of that software application or device can no longer be synchronized with the operations of the other elements in the system. Nevertheless, the software application or device may continue to operate normally without generating a detectable fault. Consequently, the timing of the operations of the affected software application or device may drift relative to the operations of other elements in the system without detection until visual artifacts or other performance problems result and are noticed by a viewer or other end user.

In another example, the timing and synchronization of one or more operational elements in a plant can be lost whenever a time-correction event occurs, such as a leap second or daylight savings time change. In a time-correction event, the current time is adjusted for all operational elements and local time references of the plant. Consequently, for each and every operational element of the plant, an operator must verify correct operation, including correct adjustment of the current time at the desired switch point, presence of a time-lock with a timing reference, and reference being made to the correct time reference for that operational element. Otherwise, visual artifacts or even extended periods of dead air can occur due to implementation of the time-correction event. Such verification processes can be time-consuming and prone to errors.

As the foregoing illustrates, what is needed in the art are more effective techniques for analyzing and verifying time in machine-based systems.

SUMMARY

One embodiment of the present invention sets forth a technique for synchronizing time in a machine-based system. The technique includes receiving time reference information for a first operational element included in the system; analyzing the time reference information against a known correct timing state for the first operational element; determining that the first operational element is not properly synchronized based on the time reference information and the known correct timing state; and in response to determining that the first operational element is not properly synchronized, causing a fault indicator associated with the first operational element to be displayed on a machine that monitors a plurality of operational elements included in the system.

At least one advantage of the disclosed techniques is that they enable error-free verification of the time synchronization of a plurality of operational elements of a machine-based network. A further advantage is that detected synchronization faults in the network can be corrected in an automated fashion and before detectable performance issues are apparent, such as the appearance of visual artifacts in a broadcast. In this fashion, the disclosed techniques provide a technical solution to a technical problem that existed with prior art approaches.

BRIEF DESCRIPTION OF THE DRAWINGS

So that the manner in which the above recited features of the disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

For clarity, identical reference numbers have been used, where applicable, to designate identical elements that are common between figures. It is contemplated that features of one example aspect may be incorporated in other example aspects without further recitation.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
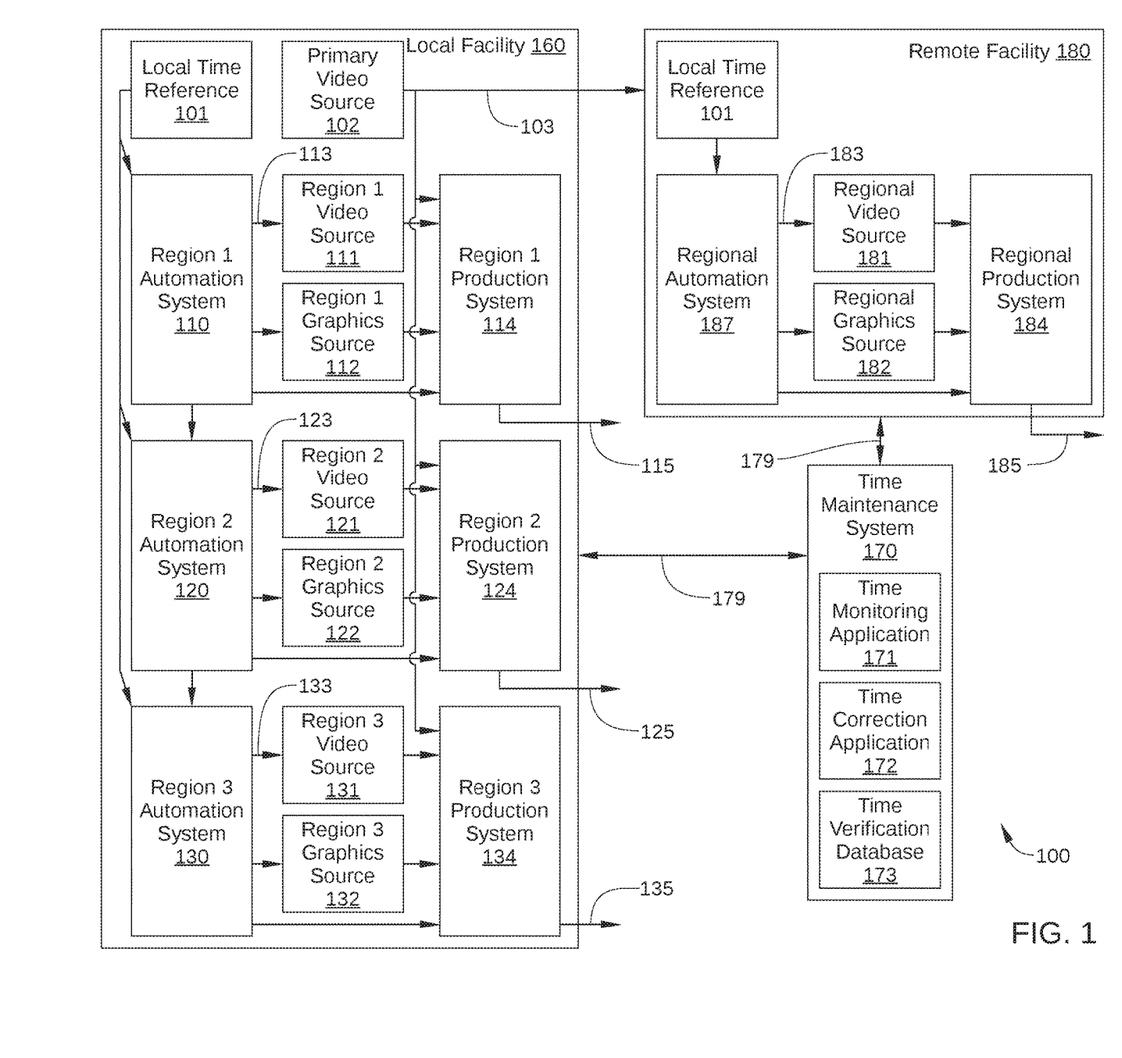
FIG. 1 illustrates a block diagram of an machine-based system configured to implement one or more aspects of the present invention.

FIG. 1 illustrates a block diagram of a machine-based system 100, configured to implement one or more aspects of the present invention. Machine-based system 100 is a machine-based system that includes a plurality of time-synchronous operational elements. That is, during normal operation, the operational elements of machine-based system 100 are locked to the same time reference, or to different time references that are each synchronized with each other. Thus, the operational elements of machine-based system 100 are synchronous with each other with no greater error than a predetermined time interval.

Machine-based system 100 can be any technically feasible information-handling system, such as an information network or automation system. In the embodiment illustrated in FIG. 1, machine-based system 100 is configured as a broadcasting system. Thus, machine-based system 100 is an information network that generates and transmits one or more video and/or audio streams that can each be broadcast nationally, to a specific region, and/or over the Internet. As such, machine-based system 100 includes a local facility 160, one or more remote facilities 180, and a time maintenance system time maintenance system 170. In such an embodiment, the various operational elements of machine-based system 100 are generally assumed to be synchronized with each other to within the duration of a single video frame. For example, when machine-based system 100 is configured to deliver one or more video streams with a frame rate of 30 frames per second, the various operational elements of machine-based system 100 are assumed to be in-sync to within 33 ms of each other. In alternative embodiments, machine-based system 100 can be any machine-based network that includes operational elements that operate synchronously, and the predetermined time interval that defines the state of being in-sync can be any suitable time interval appropriate for the functionality of the machine-based network (e.g., 1 s, 100 ms, 10 microseconds, etc.). For example, in such embodiments, machine-based system 100 may include or be incorporated in a factory automation systems or any other automated task system.

For ease of description, machine-based system 100 is described in terms of one or more video feeds, such as video-over-IP signals and/or traditional analog/digital video signals. Alternatively or additionally, machine-based system 100 may be employed in the context of audio signals and/or combined video/audio signals. Furthermore, in some embodiments, aspects of the invention described herein can be applied to any other technically feasible signal or signals that benefit from time-synchronization, such as certain control signals in a factory automation system, and the like.

Local facility 160 is a broadcast plant that includes a plurality of operational elements operable to transmit one or more regional video feeds and/or a primary video feed to one or more remote facilities 180, or other broadcasting facilities. In the embodiment illustrated in FIG. 1, local facility 160 includes a local time reference 101, a primary video source 102, and operational elements for three regional video feeds. Specifically, for generating a first regional video feed 115, machine-based system 100 includes one or more of a region 1 automation system 110 communicatively coupled to a region 1 video source 111, a region 1 graphics source 112, and a region 1 production system 114. Similarly, for generating a second regional video feed 125, machine-based system 100 includes one or more of a region 2 automation system 120 communicatively coupled to a region 2 video source 121, a region 2 graphics source 122, and a region 2 production system 124, and for generating a third regional video feed 135, machine-based system 100 includes one or more of a region 3 automation system 130 communicatively coupled to a region 3 video source 131, a region 3 graphics source 132, and a region 3 production system 134. Local facility 160 may be configured to generate more or fewer than the three regional video feeds illustrated in FIG. 1.

Local time reference 101 can be any technically feasible time reference that provides timing information to the various operational elements of local facility 160, and enables synchronization therebetween. Suitable examples of local time reference 101 include any Internet Protocol (IP) time reference (such as NTP or PTP), and/or other clock references, such as Precision Time Protocol (PCR) or Time Code. In some embodiments, local facility 160 includes multiple local time references 101. The one or more local time references 101 included in local facility 160 each derive a master reference from a known time source, such as Global Positioning System (GPS) or a local atomic clock (not shown). For clarity, in FIG. 1 local time reference 101 is illustrated transmitting timing reference information only to region 1 automation system 110, region 2 automation system 120, and region 3 automation system 130. In practice, one or more of local time references 101 also transmit timing reference information to each of the operational elements of local facility 160.

Primary video source 102 is an operational element of local facility 160 that provides originating programming for broadcasting in one or more regions remote from local facility 160, such as a sporting event, television show, movie, or other programming. Such originating programming is generally identical in each region or other location in which the originating programming is broadcast. Programming that varies by region, such as region-specific advertising and region-specific graphic overlays, is provided by other operational elements, and is inserted interstitially in predetermined time slots within the originating programming. Specifically, in the embodiment illustrated in FIG. 1, region-specific interstitial programming included in first regional video feed 115 is provided by region 1 video source 111, region-specific interstitial programming included in second regional video feed 125 is provided to by region 2 video source 121, and region-specific interstitial programming included in third regional video feed 135 is provided by region 3 video source 131. Similarly, region-specific graphics included in first regional video feed 115 is provided by region 1 graphics source 112, region-specific graphics included in second regional video feed 125 is provided by region 2 graphics source 122, and region-specific graphics included in third regional video feed 135 is provided by region 3 graphics source 132. First regional video feed 115, second regional video feed 125, and third regional video feed 135 are regional feeds that can be fed to a region-specific TV station, multichannel video programming distributor (MVPD) or other service provider, satellite provider, or the like, ultimately arriving at the consumer point of use.

Region 1 automation system 110 is a computer-based, real-time management system operable to control the local region video/graphical sources that make up the interstitial content and branding for that region, such as region 1 video source 111 and region 1 graphics source 112. In addition, region 1 automation system 110 is operable to control region 1 production system 114, which is the system that makes the timed switches between video data from the primary video source 102 and the regional sources (region 1 video source 111 and region 1 graphics source 112). For example, in some embodiments, region 1 production system 114 receives various video inputs from primary video source 102, region 1 video source 111, and region 1 graphics source 112, and interleaves these inputs to generate first regional video feed 115. Region 1 production system 114 the transmits first regional video feed 115 to region 1. In some embodiments, a control connection 113 between region 1 automation system 110 and the controlled devices or applications is any one of an IP, serial, or other type of interface. Region 2 automation system 120 and region 3 automation system 130 are similar in organization and operation to region 1 automation system 110, but service different respective regions, and consequently generate second regional video feed 125 and third regional video feed 135, respectively.

In operation, the operational elements of local facility 160, including the region 1 operational elements, the region 2 operational elements, and the region 3 operational elements, are each locked to local time reference 101. As a result, each of the operational elements of local facility 160 has a proper time reference, and the control signals therebetween operate synchronously with one another. Consequently, the video insertion processes for region 1 performed by region 1 automation system 110, region 1 video source 111, region 1 graphics source 112, and region 1 production system 114 to generate first regional video feed 115 are generally seamless and free of visual artifacts. Region 2 automation system 120, region 2 video source 121, region 2 graphics source 122, a control connection 123, and region 2 production system 124 act similarly together to generate second regional video feed 125, and region 3 automation system 130, region 3 video source 131, region 3 graphics source 132, a control connection 133, and region 3 production system 134 act similarly together to generate second regional video feed 135.

Remote facility 180 is a broadcast plant that includes a plurality of operational elements operable to transmit a regional video feed 185 to a particular region. In some embodiments, remote facility 180 is a mirror image of at least a portion of local facility 160, and generates a video feed 185. Thus, in the embodiment illustrated in FIG. 1, remote facility 180 includes a regional automation system 187, a regional video source 181, a regional graphics source 182, and a regional production system 184. Video feed 185 may be provided to one or more alternate regions, or may act as a backup for one of first regional video feed 115, second regional video feed 125, or third regional video feed 135. In some embodiments, remote facility 180 receives the same originating programming from primary video source 102 via an inter-facility link 103, which can be a satellite, fiber, microwave, or any other technically feasible communications link.

The functionality of each of the operational elements of local facility 160 and remote facility 180 can be implemented as a software application running on a one or more computing devices. For example, in some embodiments, all region 1 related operational elements (region 1 automation system 110, region 1 video source 111, region 1 graphics source 112, and region 1 production system 114) are software applications running on a single computing device, all region 2 related operational elements are software applications running on a single computing device, and all region 3 related operational elements are software applications running on a single computing device. Alternatively, one or more of the operational elements of local facility 160 are software applications running on multiple networked servers or other computing devices. Alternatively or additionally, in some embodiments, the functionality of one or more of the operational elements of local facility 160 and remote facility 180 can be implemented partially or entirely in hardware, such as an application-specific integrated circuit (ASIC), a field-programmable gate array (FPGA), and the like. Further, in some embodiments, some or all of these servers, computing devices, and/or hardware devices can be disposed in different and widely dispersed data centers or other locations.

The disparate makeup and geographically dispersed locations of the various operational elements of local facility 160 and remote facility 180 can make maintaining the synchronization therebetween problematic. For example, each of the various operational elements of local facility 160 and/or remote facility 180 can originate from different vendors. As a result, fault reporting can be non-uniform or, in the case of some operational elements, non-existent; often software applications and hardware devices employed as operational elements in machine-based system 100 have no fault-reporting capability at all. In addition, having various operational elements dispersed over multiple locations complicates time synchronization across machine-based system 100. According to various embodiments, time maintenance system 170 addresses these issues.

Time maintenance system 170 is a computer-based, real-time management system operable to monitor and control the time synchronization of the operational elements of machine-based system 100. More specifically, time maintenance system 170 determines the time status of each operational element, even when one or more such elements include no inherent fault-reporting capability and/or are widely dispersed across various geographical locations. As such, time maintenance system 170 can be located within local facility 160 or remote from local facility 160. In the latter case, time and maintenance system 170 is communicatively coupled to one or more local facilities and remote facilities 180 via an inter-facility link 179.

Time maintenance system 170 is a software application operable to determine the time synchronization status of each operational element of machine-based system 100. In addition, in some embodiments, time maintenance system 170 is operable to correct the time status of any operational elements determined to have a time-related fault. Accordingly, time maintenance system 170 includes a time monitoring application 171, a time correction application 172, a time verification database 173, and, in some embodiments, a local time reference 101.

Time monitoring application 171 determines the current fault status and other time status information for each of the operational elements of machine-based system 100, using one or more techniques. Examples of time status information for a particular operational element includes the current time, to what local time reference 101 the operational element is locked, what redundant time references are currently available to the operational element, network route information for the local time reference 101 (when the local time reference 101 is an IP reference), etc.

In embodiments in which operational elements are configured to publish time faults and/or time status information, time monitoring application 171 is configured to receive any time faults and/or time status information from such operational elements as a subscriber. In embodiments in which operational elements are configured to generate Simple Network Management Protocol (SNMP) traps or other alert messages to report fault events related to the operational element, time monitoring application 171 is configured as an SNMP trap manager that receives the traps when generated. In such embodiments, the time faults and/or time status information can be included as payload information in the trap, or be incorporated into the trap via an object identification (OID) value or other metadata associated with the trap. In embodiments in which operational elements have no active reporting capability, time monitoring application 171 can query each such operational element for suitable time fault and/or other time status information. Alternatively, when an operational element is not configured to respond to queries, time monitoring application 171 can indirectly determine whether the operational element is locked to a proper time reference based on current time information extracted from the operational element. An embodiment in which time monitoring application 171 determines the current fault status and other time status information for each of the operational elements of machine-based system 100 is described below in conjunction with FIGS. 2-4.

Time correction application 172 corrects the time status of an operational element machine-based system 100 determined to have a time-related fault. In some embodiments, time correction application 172 performs such corrections automatically, and in other embodiments, time correction application 172 performs such corrections based on a user input. An embodiment in which time correction application 172 corrects the time status of an operational element is described below in conjunction with FIG. 5.

Time verification database 173 stores data pertinent to the operation of time maintenance system 170, including configuration data and a known good state for each operational element of machine-based system 100. Examples of pertinent configuration data for an operational element is whether the element is configured to publish time faults and/or time status information, or generate SNMP traps or other alert messages to report fault events. Other examples of pertinent configuration data for an operational element is whether the element has no active reporting capability, and whether the operational element can respond to queries for time-fault information. In the embodiment illustrated in FIG. 1, time verification database 173 is stored locally, but in other embodiments, time verification database 173 can be stored remotely from time maintenance system 170.

Figure 2:
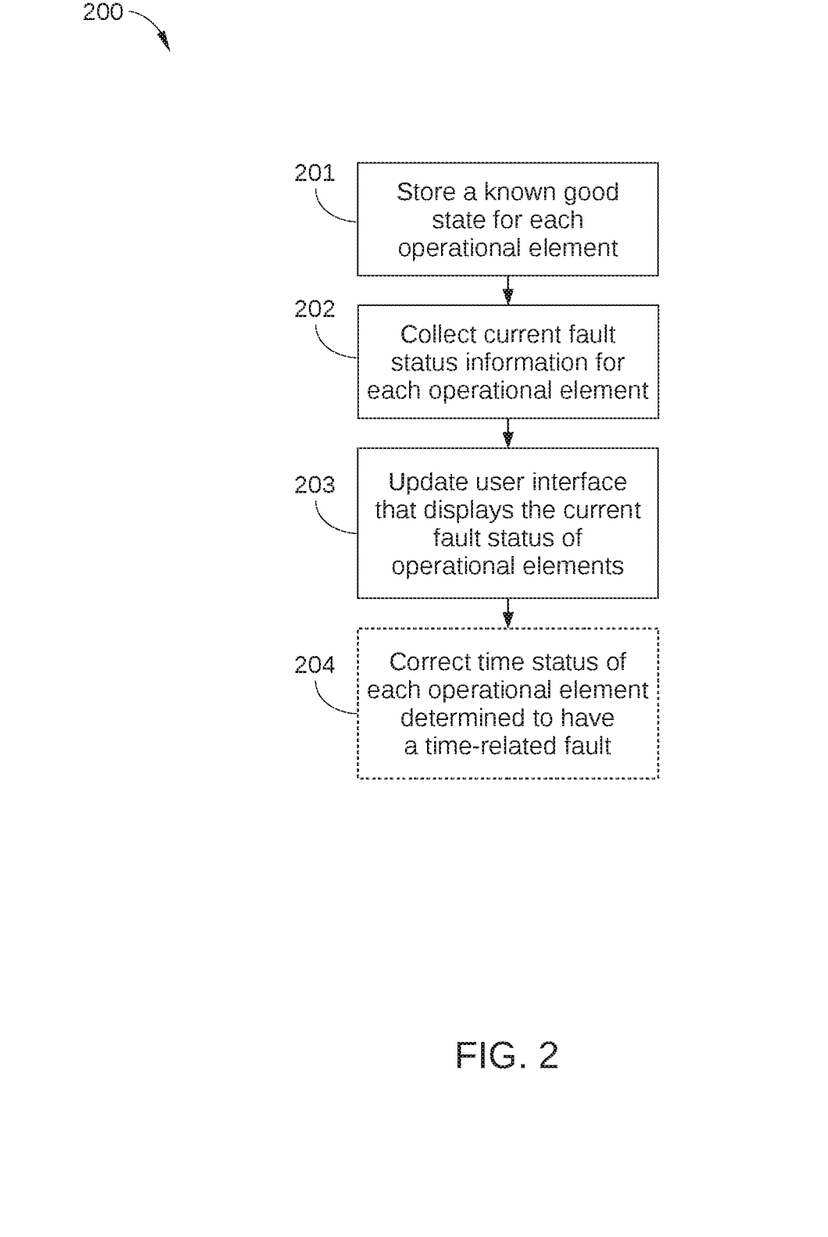
FIG. 2 is a flowchart of method steps for determining the current fault status of one or more operational elements included in the machine-based system of FIG. 1, according to various embodiments of the present invention.

FIG. 2 is a flowchart of method steps for determining current fault status of one or more operational elements of machine-based system 100, according to various embodiments of the present invention. Although the method steps are described with respect to the systems of FIG. 1, persons skilled in the art will understand that the method steps may also be performed in conjunction with other machine-based systems without exceeding the scope of the invention.

As shown, a method 200 begins at step 201, where time monitoring application 171 stores a known good state for an operational element of machine-based system 100. In some embodiments, a known good state for an operational element of machine-based system 100 includes one or more of: the current time reference for the operational element, what redundant time references are currently available to the operational element, network routing information for the current reference, etc. In some embodiments, other element-specific information may also be included in the known good state for the operational element. The known good states can be stored locally and/or remotely from the computing device running time maintenance system 170.

In step 202, time monitoring application 171 collects current fault status information from each of the operational elements. For operational elements that are configured to publish time faults and/or time status information, in step 202 time monitoring application 171 receives such published time faults and/or time status information, or confirms that suitable time fault and/or time status information has been received from such operational elements within a predetermined maximum time interval. In such embodiments, time monitoring application 171 can determine the fault status of such operational elements based on the published time status information and a known good state for that operational element. For example, time monitoring application 171 may determine that a particular operational element is locked to the incorrect time reference. Thus, while the operational element is currently operating normally, future time-synchronization issues may occur related to being locked to the incorrect time reference.

In some embodiments, step 202 is performed periodically, for example once per day or once per hour. Additionally or alternatively, in some embodiments, step 202 is performed in response to certain events, such as a possible fault-inducing event (power surge, power outage, earthquake, etc.) or a time-correction event (leap year, leap second, daylight savings adjustment, etc.).

For operational elements that are configured to actively report fault events related to the operational element, for example by generating SNMP traps or other alert messages, in step 202 time monitoring application 171 receives pertinent time fault and/or time status information via such alert messages. In such embodiments, time monitoring application 171 can determine the fault status of such operational elements based on a specific time fault included in such an alert message, and/or on a known good state for that operational element.

For operational elements that have no active reporting capability, time monitoring application 171 can either query each such operational element, or indirectly determine whether the operational element is locked to a proper time reference based on current time information extracted from the operational element. An embodiment of a process by which time monitoring application 171 performs such queries or time-information extraction is described in greater detail below in conjunction with FIG. 4.

In step 203, time monitoring application 171 updates a user interface that displays the current fault status of each operational element of machine-based system 100. Alternatively or additionally, in step 203 time monitoring application 171 updates time verification database 173 that tracks the current time-fault status of each operational element of machine-based system 100. The user interface displays the current fault status of each operational element of machine-based system 100 to enable visualization and facilitate detection of time and synchronization faults by a user/operator of machine-based system 100. In some embodiments, the time-fault status displayed by the user interface for a particular operational element includes multiple factors. One such embodiment is illustrated in FIG. 3.

Figure 3:
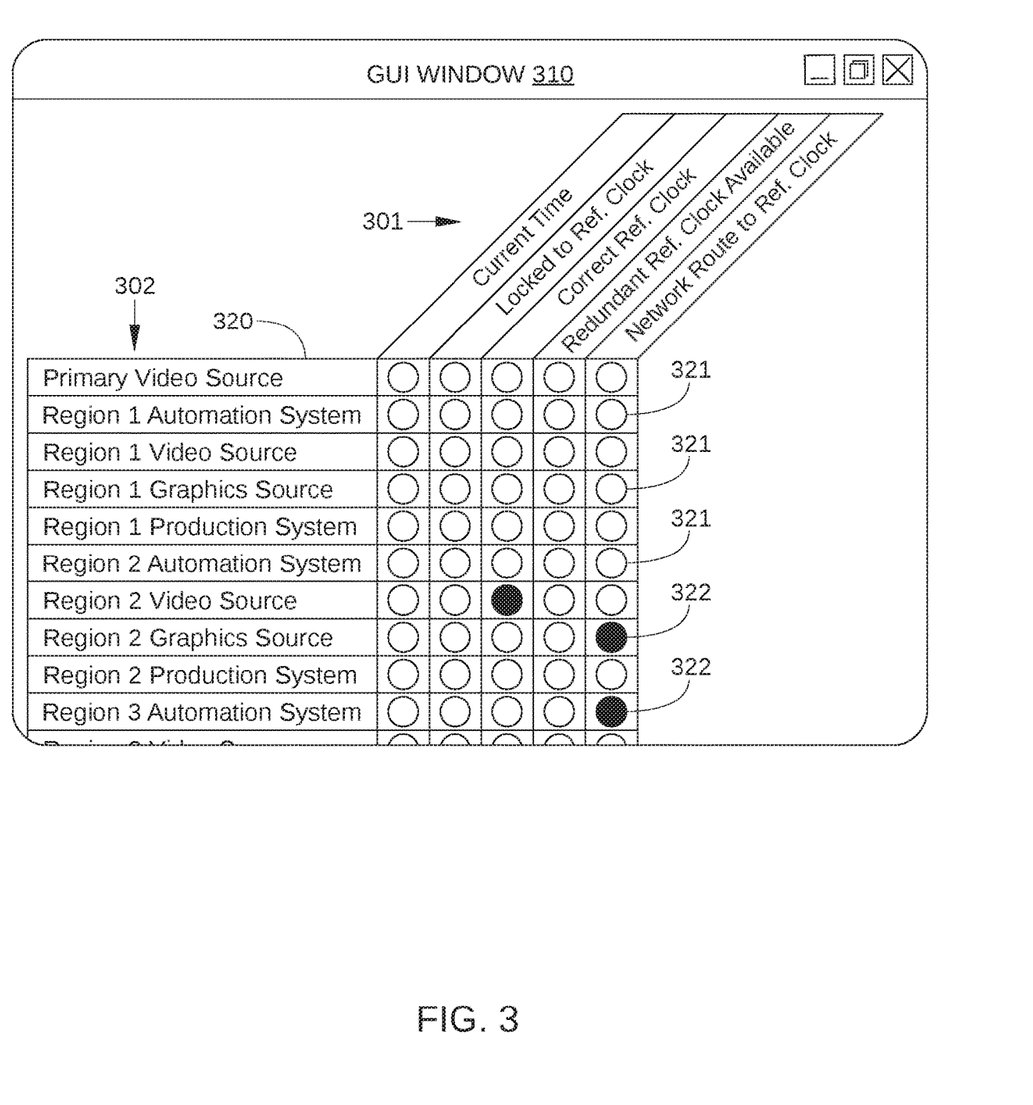
FIG. 3 schematically illustrates a graphical user interface (GUI) window displayed by the time maintenance system of FIG. 1, according to various embodiments of the invention.

FIG. 3 schematically illustrates a graphical user interface (GUI) window 310 displayed by time maintenance system 170, according to various embodiments of the invention. As shown, in some embodiments, GUI window 310 displays the multiple status factors 301 for each operational element 302 of machine-based system 100. In the embodiment illustrated in FIG. 3, GUI window 310 presents each status factor 301 in a tabular format 320, with no-fault indicators 321 and fault indicators 322, as appropriate. In other embodiments, GUI window 310 presents status factors 301 for operational elements 302 using any other physical or logical topology or visual presentation format. For example, in some embodiments, the relative positions of operational elements 302 can be displayed based on a geographical or hierarchical representation of machine-based system 100. Alternatively, in some embodiments, the status factors 301 of operational elements 302 can be displayed in a dashboard format.

Returning now to FIG. 2, in optional step 204, time correction application 172 corrects the time status of any operational elements 302 determined to have a time-related fault. An embodiment in which time correction application 172 corrects the time status of an operational element is described below in conjunction with FIG. 5.

As noted above, in embodiments in which operational elements have no active reporting capability, time monitoring application 171 can either query each such operational element, or indirectly determine whether the operational element is locked to a proper time reference based on current time information extracted from the operational element. One such embodiment is illustrated in FIG. 4.

Figure 4:
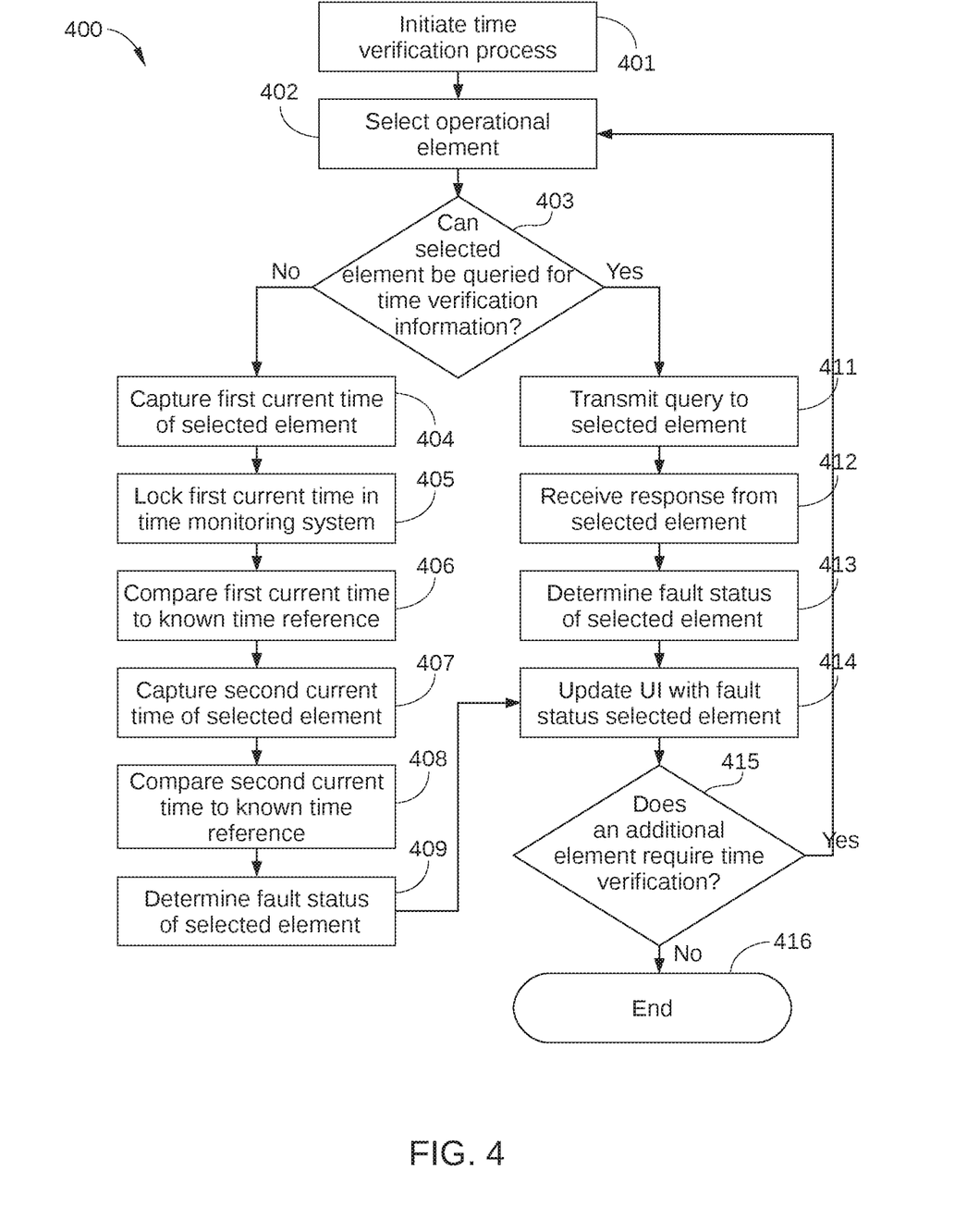
FIG. 4 is a flowchart of method steps for determining the current fault status of one or more operational elements of the machine-based system of FIG. 1, according to other various embodiments of the present invention.

FIG. 4 is a flowchart of method steps for determining the current fault status of one or more operational elements of machine-based system 100, according to other various embodiments of the present invention. Although the method steps are described with respect to machine-based system 100 the system of FIGS. 1 and 3, persons skilled in the art will understand that the method steps may also be performed in conjunction with other operational systems without exceeding the scope of the invention.

As shown, a method 400 begins at step 401, where time monitoring application 171 initiates a time verification process. For example, in some embodiments, time monitoring application 171 initiates a time verification process as part of performing step 202 of FIG. 2.

In step 402, time monitoring application 171 selects a particular operational element from the plurality of operational elements in machine-based system 100 that have no active reporting capability.

In step 403, time monitoring application 171 determines whether the selected operational element can be queried for time verification information. If no, method 400 proceeds to step 404; if yes, method 400 proceeds to step 411. In some embodiments, time monitoring application 171 makes the determination of step 403 based on configuration data for the selected operational element that is stored in time verification database 173.

In step 404, time monitoring application 171 captures a first current time for the selected operational element, i.e., what the selected operational element considers the current time. In some embodiments, time monitoring application 171 captures the first current time by sampling the time signal at a high enough sample rate to be accurate and granular to the nanosecond (ns) range. This sample would then be stored in a buffer.

In step 405, time monitoring application 171 locks the first current time in a time-monitoring system. In some embodiments, time monitoring application 171 does so by referencing the buffer storing the sample (of step 404) to a known precision reference. This buffer is then incremented by that precision reference such that the buffer is counting time accurately, as determined by the precision reference.

In step 406, time monitoring application 171 compares the first current time to a known time reference, such as a local reference 101.

In step 407, time monitoring application 171 captures a second current time for the selected operational element, using similar techniques as those described in step 404. Step 406 is performed after a suitable delay, so that time drift that occurs when the selected operational element is not locked to a time reference can be more readily detected. For example, in some embodiments, such a delay is on the order of about one hour. Alternatively or additionally, the delay can be for a larger time interval, such as a day or week.

In step 408, time monitoring application 171 compares the second current time to a known time reference, such as a local reference 101.

In step 409, time monitoring application 171 determines a current fault status of the selected operational element. Specifically, when the drift is detected between the current time of the selected operational element and the current time of the known time reference, the fault status of the selected operational element is updated to indicate that the selected operational element is not locked to a time reference. Method 400 then proceeds to step 414.

In step 411, which is performed in response to time monitoring application 171 determining that the selected operational element can respond to queries, time monitoring application 171 transmits a query to the selected operational element. In some embodiments, the query includes a request for fault status and/or time status of the selected operational element.

In step 412, time monitoring application 171 receives a response from the selected operational element.

In step 413, time monitoring application 171 determines the current fault status of the selected operational element, based on the time reference information received in step 412 and the known correct state for the selected operational element. For example, in some embodiments, time monitoring application 171 compares the known good state to the time reference information received in step 412.

In step 414, time monitoring application 171 updates time verification database 173 to reflect the current fault status of the selected operational element.

In step 415, time monitoring application 171 determines whether there is an additional operational element of machine-based system 100 that requires timing verification to be performed. If yes, method 400 proceeds back to step 402, discussed above; if no, method 400 proceeds to step 416 and terminates.

As noted above, in some embodiments, subsequent to time monitoring application 171 detecting time-related faults, time correction application 172 corrects the time status of any operational elements determined to have a time-related fault. One such embodiment illustrated in FIG. 5.

Figure 5:
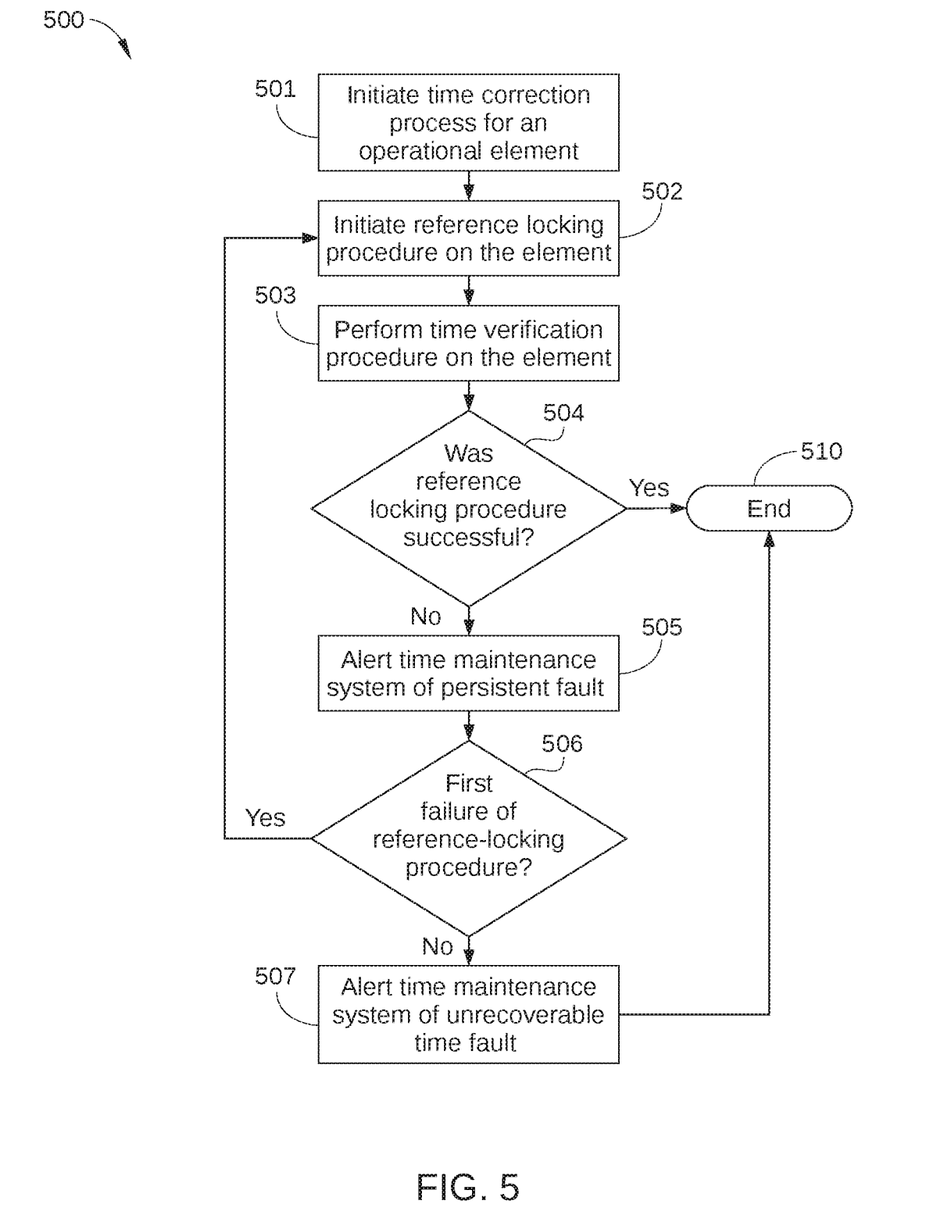
FIG. 5 is a flowchart of method steps for determining current fault status of one or more operational elements of the machine-based system of FIG. 1, according to yet other various embodiments of the present invention.

FIG. 5 is a flowchart of method steps for determining current fault status of one or more operational elements of machine-based system 100, according to yet other various embodiments of the present invention. Although the method steps are described with respect to the systems of FIGS. 1 and 3, persons skilled in the art will understand that the method steps may also be performed in conjunction with other operational systems without exceeding the scope of the invention.

As shown, a method 500 begins at step 501, where time correction application 172 initiates a time correction process for an operational element that has a time fault, such as no lock to a known time reference, or a time that varies from a known time reference by more than a particular maximum deviation.

In step 502, time correction application 172 initiates a reference-locking procedure for the operational element. In some embodiments, such a procedure includes access through an API (Active Programming Interface), SDK (Software Development Kit) or other type of service-oriented architecture to the settings within the operational element that control the time and reference attributes. These settings would be then corrected to the known-good settings.

In step 503, time correction application 172 performs a time verification procedure to confirm whether the reference-locking procedure is successful. In some embodiments, the time verification procedure includes steps 404-409 of method 400. In other embodiments, the time verification procedure includes steps 411-413 of method 400.

In step 504, time correction application 172 determines whether the reference-locking procedure of step 502 was successful, based on the results of the time verification procedure of step 503. If yes, method 500 proceeds to step 510 and ends; if no, method 500 proceeds to step 505.

In step 505, time correction application 172 alerts time maintenance system 170 that a persistent time fault has occurred and logs actions taken in time verification database 173.

In step 506, time correction application 172 determines whether this is the first failure of the reference-locking procedure of step 502. If yes, method 500 proceeds back to step 502 to retry the reference-locking procedure; if no, method 500 proceeds to step 507.

In step 507, time correction application 172 alerts time maintenance system 170 that an unrecoverable time fault has occurred in the operational element, and user intervention is appropriate. The method 500 terminates at step 510.

As noted above, time maintenance system 170 is a software application running on one or more computing devices. An embodiment of one such computing device is illustrated in FIG. 6.

Figure 6:
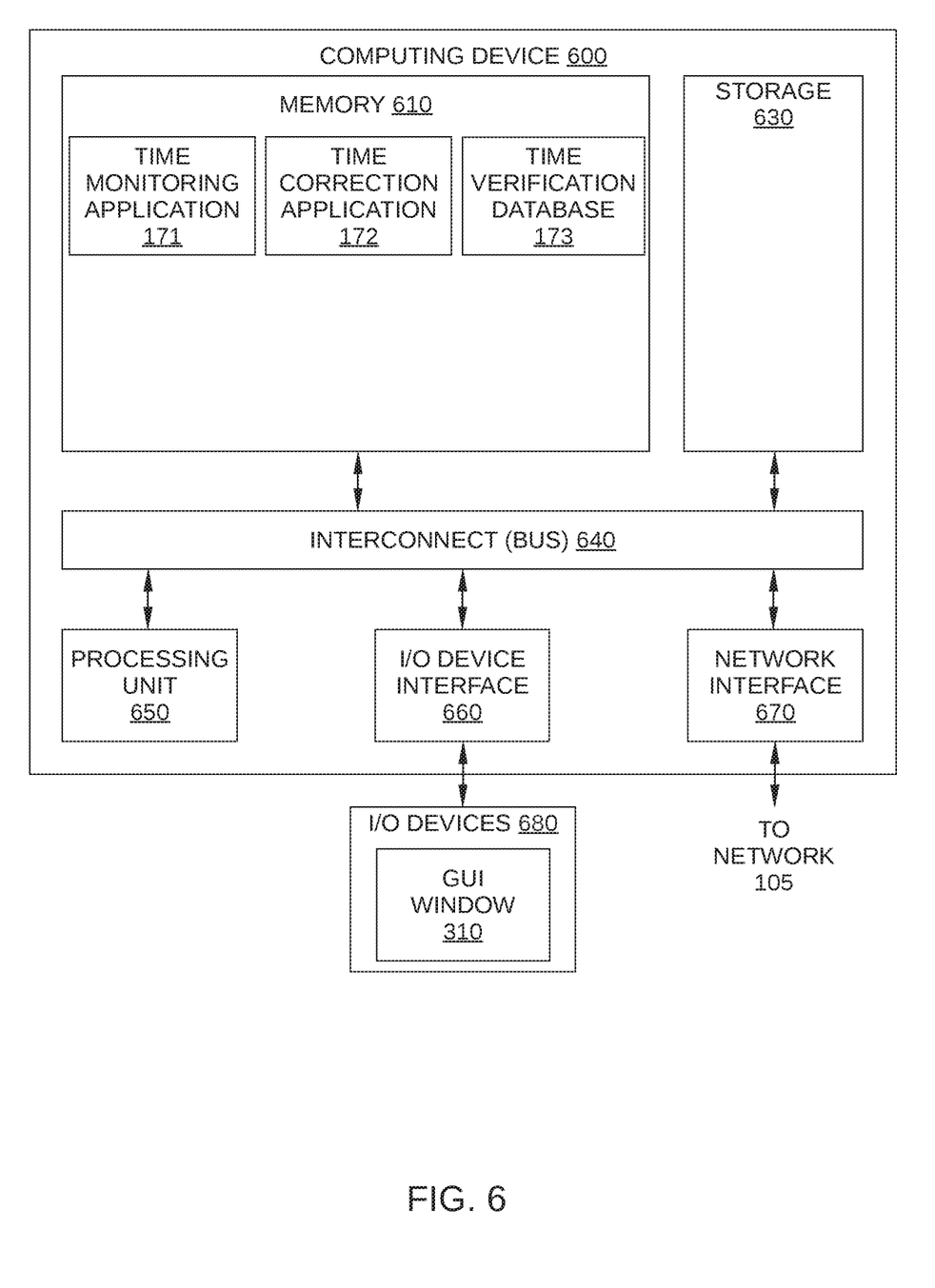
FIG. 6 is an illustration of a computing device, according to various embodiments of the present invention.

FIG. 6 is an illustration of a computing device 600, according to various embodiments of the present invention. Computing device 600 may be a desktop computer, a laptop computer, a smart phone, or any other type of computing device suitable for practicing one or more embodiments of the present invention. In operation, computing device 600 is configured to execute time maintenance system 170, as described herein. It is noted that the computing device described herein is illustrative and that any other technically feasible configurations fall within the scope of the present invention.

As shown, computing device 600 includes, without limitation, an interconnect (bus) 640 that connects a processing unit 650, an input/output (I/O) device interface 660 coupled to input/output (I/O) devices 680, a memory 610, a storage 630, and a network interface 670. Processing unit 650 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU or digital signal processor (DSP). In general, processing unit 650 may be any technically feasible hardware unit capable of processing data and/or executing software applications, including time maintenance system 170. Further, in the context of this disclosure, the computing elements shown in computing device 600 may correspond to a physical computing system (e.g., a system in a data center) or may be a virtual computing instance executing within a computing cloud.

I/O devices 680 may include devices capable of providing input, such as a keyboard, a mouse, a touch-sensitive screen, and so forth, as well as devices capable of providing output, such as an output device that displays GUI window 310. Additionally, I/O devices 680 may include devices capable of both receiving input and providing output, such as a touchscreen, a universal serial bus (USB) port, and so forth. I/O devices 680 may be configured to receive various types of input from an end-user of computing device 600, and to also provide various types of output to the end-user of computing device 600, such as displayed digital images or digital videos. In some embodiments, one or more of I/O devices 680 are configured to couple computing device 600 to a network 105.

Memory 610 may include a random access memory (RAM) module, a flash memory unit, or any other type of memory unit or combination thereof. Processing unit 650, I/O device interface 660, and network interface 670 are configured to read data from and write data to memory 610. Memory 610 includes various software programs that can be executed by processor 650 and application data associated with said software programs, including time maintenance system 170.

In some embodiments, computing device 600 is communicatively connected to network 105, which may be any technically feasible type of communications network that allows data to be exchanged between computing device 600 and external entities or computing devices (not shown). For example, network 105 may include a wide area network (WAN), a local area network (LAN), a wireless (WiFi) network, and/or the Internet, among others.

In sum, a computer-based, real-time management system verifies and manages time synchronization between the multiple operational elements in an information network, such as software applications and hardware devices. Specifically, the current fault status and other time status information for each of the operational elements in the network is received, extracted, or measured in an automated fashion via a time maintenance system, and the current fault status can be displayed for easy visualization of time faults. Fault status of a particular operational element can be determined based on a known good state of the operational element and current time status information of the operational element.

At least one advantage of the disclosed techniques is that they enable error-free verification of the time synchronization of a plurality of operational elements of a machine-based network. A further advantage is that detected synchronization faults in the network can be corrected in an automated fashion and before detectable performance issues are apparent, such as the appearance of visual artifacts in a broadcast. In this fashion, the disclosed techniques provide a technical solution to a technical problem that existed with prior art approaches.

1. In some embodiments, a non-transitory computer-readable storage medium includes instructions that, when executed by a processor, cause the processor to synchronize time in a machine-based system by performing the steps of: receiving time reference information for a first operational element included in the system; analyzing the time reference information against a known correct timing state for the first operational element; determining that the first operational element is not properly synchronized based on the time reference information and the known correct timing state; and in response, causing a fault indicator associated with the first operational element to be displayed on a machine that monitors a plurality of operational elements included in the system.

2. The non-transitory computer-readable storage medium of clause 1, further comprising instructions that, when executed by the processor, cause the processor to perform one or more operations to properly synchronize the first operational element.

3. The non-transitory computer-readable storage medium of clauses 1 or 2, wherein performing the one or more operations comprises performing a reference-locking procedure for the first operational element.

4. The non-transitory computer-readable storage medium of any of clauses 1-3, wherein the known correct timing state for the first operational element is based on time reference information from a time reference to which one or more operational elements of the machine-based system are synchronized.

5. The non-transitory computer-readable storage medium of any of clauses 1-4, wherein determining that the first operational element is not properly synchronized comprises comparing the time reference information for the first operational element to a time reference to which one or more other operational elements of the machine-based system are synchronized.

6. The non-transitory computer-readable storage medium of any of clauses 1-5, wherein determining that the first operational element is not properly synchronized comprises: querying the first operational element; receiving from the first operational element a response that includes time fault information associated with the first operational element; and determining a fault status of the first operational element based on the time fault information.

7. The non-transitory computer-readable storage medium of any of clauses 1-6, wherein the time fault information indicates at least one of whether the first operational element is not locked to a time reference associated with the known correct timing state, whether a fault condition is present in the first operational element, and whether a redundant time reference associated with the known correct timing state is available for the first operational element.

8. The non-transitory computer-readable storage medium of any of clauses 1-7, wherein determining that the first operational element is not properly synchronized comprises determining whether the first operational element is drifting from a time reference to which one or more other operational elements of the machine-based system are synchronized.

9. The non-transitory computer-readable storage medium of any of clauses 1-8, wherein analyzing the time reference information against the known correct timing state for the first operational element comprises retrieving the known correct timing state from a database.

10. In some embodiments, a method of synchronizing time in a machine-based system comprises: receiving time reference information for a first operational element included in the system; analyzing the time reference information against a known correct timing state for the first operational element; determining that the first operational element is not properly synchronized based on the time reference information and the known correct timing state; and in response, causing a fault indicator associated with the first operational element to be displayed on a machine that monitors a plurality of operational elements included in the system.

11. The method of clause 10, further comprising, performing one or more operations to properly synchronize the first operational element.

12. The method of clauses 10 or 11, wherein performing the one or more operations comprises performing a reference-locking procedure for the first operational element.

13. The method of any of clauses 10-12, wherein the known correct timing state for the first operational element is based on time reference information from a time reference to which one or more operational elements of the machine-based system are synchronized.

14. The method of any of clauses 10-13, wherein determining that the first operational element is not properly synchronized comprises comparing the time reference information for the first operational element to a time reference to which one or more other operational elements of the machine-based system are synchronized.

15. The method of any of clauses 10-14, wherein determining whether the first operational element is drifting comprises: capturing a first current time associated with the first operational element; comparing the first current time to the time reference to which the one or more other operational elements are synchronized; capturing a second current time of the first operational element; and comparing the second current time associated with the time reference to which the one or more other operational elements are synchronized.

16. In some embodiments, a system comprises: a local time reference; a memory storing a time maintenance application; and one or more processors that are coupled to the memory and the local time reference, and when executing the time maintenance application, are configured to: receive time reference information for a first operational element included in the system; analyze the time reference information against a known correct timing state for the first operational element; determine that the first operational element is not properly synchronized based on the time reference information and the known correct timing state; and in response, cause a fault indicator associated with the first operational element to be displayed on a machine that monitors a plurality of operational elements included in the system.

17. The system of clause 16, further comprising, performing one or more operations to properly synchronize the first operational element.

18. The system of clauses 16 or 17, wherein performing the one or more operations comprises performing a reference-locking procedure for the first operational element.

19. The system of any of clauses 16-18, wherein the known correct timing state for the first operational element is based on time reference information from a time reference to which one or more operational elements of the machine-based system are synchronized.

20. The system of any of clauses 16-19, wherein determining that the first operational element is not properly synchronized comprises comparing the time reference information for the first operational element to a time reference to which one or more other operational elements of the machine-based system are synchronized.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

We claim:

1. A non-transitory computer-readable storage medium including instructions that, when executed by a processor, cause the processor to synchronize time in a machine-based system by performing the steps of:

receiving time reference information for a first operational element included in the machine-based system, wherein the time reference information is associated with a time reference source to which the first operational element is currently locked;

analyzing the time reference information against a known correct timing state for the first operational element, wherein the known correct timing state is associated with a proper time reference source for the first operational element that is different from the time reference source to which the first operational element is currently locked;

determining that the first operational element is not properly synchronized based on the time reference information and the known correct timing state; and in response to determining that the first operational element is not properly synchronized, causing a fault indicator associated with the first operational element to be displayed on a machine that monitors a plurality of operational elements included in the machine-based system.

2. The non-transitory computer-readable storage medium of claim 1, further comprising instructions that, when executed by the processor, cause the processor to perform one or more operations to properly synchronize the first operational element.

3. The non-transitory computer-readable storage medium of claim 2, wherein performing the one or more operations comprises performing a reference-locking procedure for the first operational element.

4. The non-transitory computer-readable storage medium of claim 1, wherein the known correct timing state for the first operational element is derived from first time reference information generated by the proper time reference source.

5. The non-transitory computer-readable storage medium of claim 1, wherein determining that the first operational element is not properly synchronized comprises comparing the time reference information for the first operational element to first time reference information generated by the proper time reference source.

6. The non-transitory computer-readable storage medium of claim 1, wherein determining that the first operational element is not properly synchronized comprises:
querying the first operational element;
receiving from the first operational element a response that includes time fault information associated with the first operational element; and
determining a fault status of the first operational element based on the time fault information.

7. The non-transitory computer-readable storage medium of claim 6, wherein the time fault information indicates at least one of whether the first operational element is not locked to the proper time reference source, whether a fault condition is present in the first operational element, or whether a redundant time reference associated with the known correct timing state is available for the first operational element.

8. The non-transitory computer-readable storage medium of claim 1, wherein determining that the first operational element is not properly synchronized comprises determining whether the first operational element is drifting from first time reference information generated by the proper time reference source.

9. The non-transitory computer-readable storage medium of claim 1, wherein analyzing the time reference information against the known correct timing state for the first operational element comprises retrieving the known correct timing state from a database.

10. A method of synchronizing time in a machine-based system, the method comprising:
receiving time reference information for a first operational element included in the machine-based system, wherein the time reference information is associated with a time reference source to which the first operational element is currently locked;
analyzing the time reference information against a known correct timing state for the first operational element, wherein the known correct timing state is associated with a proper time reference source for the first operational element that is different from the time reference source to which the first operational element is currently locked;
determining that the first operational element is not properly synchronized based on the time reference information and the known correct timing state; and
in response to determining that the first operational element is not properly synchronized, causing a fault indicator associated with the first operational element to be displayed on a machine that monitors a plurality of operational elements included in the machine-based system.

11. The method of claim 10, further comprising, performing one or more operations to properly synchronize the first operational element.

12. The method of claim 11, wherein performing the one or more operations comprises performing a reference-locking procedure for the first operational element.

13. The method of claim 10, wherein the known correct timing state for the first operational element is derived from first time reference information generated by the proper time reference source.

14. The method of claim 10, wherein determining that the first operational element is not properly synchronized comprises comparing the time reference information for the first operational element to first time reference information generated by the proper time reference source.

15. The method of claim 10, wherein determining that the first operational element is not properly synchronized comprises determining whether the first operational element is drifting from first time reference information generated by the proper time reference source, and wherein determining whether the first operational element is drifting comprises:
capturing a first current time associated with the first operational element;
comparing the first current time to the first time reference information;
capturing a second current time of the first operational element; and
comparing the second current time to second time reference information generated by the proper time reference source.

16. A system, comprising:
a local time reference;
a memory storing a time maintenance application; and
one or more processors that are coupled to the memory and the local time reference, and when executing the time maintenance application, are configured to:
receive time reference information for a first operational element included in the system, wherein the time reference information is associated with a time reference source to which the first operational element is currently locked;
analyze the time reference information against a known correct timing state for the first operational element, wherein the known correct timing state is associated with a proper time reference source for the first operational element that is different from the time reference source to which the first operational element is currently locked;
determine that the first operational element is not properly synchronized based on the time reference information and the known correct timing state; and
in response to determining that the first operational element is not properly synchronized, cause a fault indicator associated with the first operational element to be displayed on a machine that monitors a plurality of operational elements included in the system.

17. The system of claim 16, wherein the one or more processors, when executing the time maintenance application, are further configured to perform one or more operations to properly synchronize the first operational element.

18. The system of claim 17, wherein performing the one or more operations comprises performing a reference-locking procedure for the first operational element.

19. The system of claim 16, wherein the known correct timing state for the first operational element is derived from first time reference information generated by the proper time reference source.

20. The system of claim 16, wherein determining that the first operational element is not properly synchronized comprises comparing the time reference information for the first operational element to first time reference information generated by the proper time reference source.

* * * * *